May 27, 1969  P. DZIULAK  3,445,940
RNA PROTEIN SYNTHESIS MODEL
Filed Dec. 28, 1966  Sheet 1 of 2
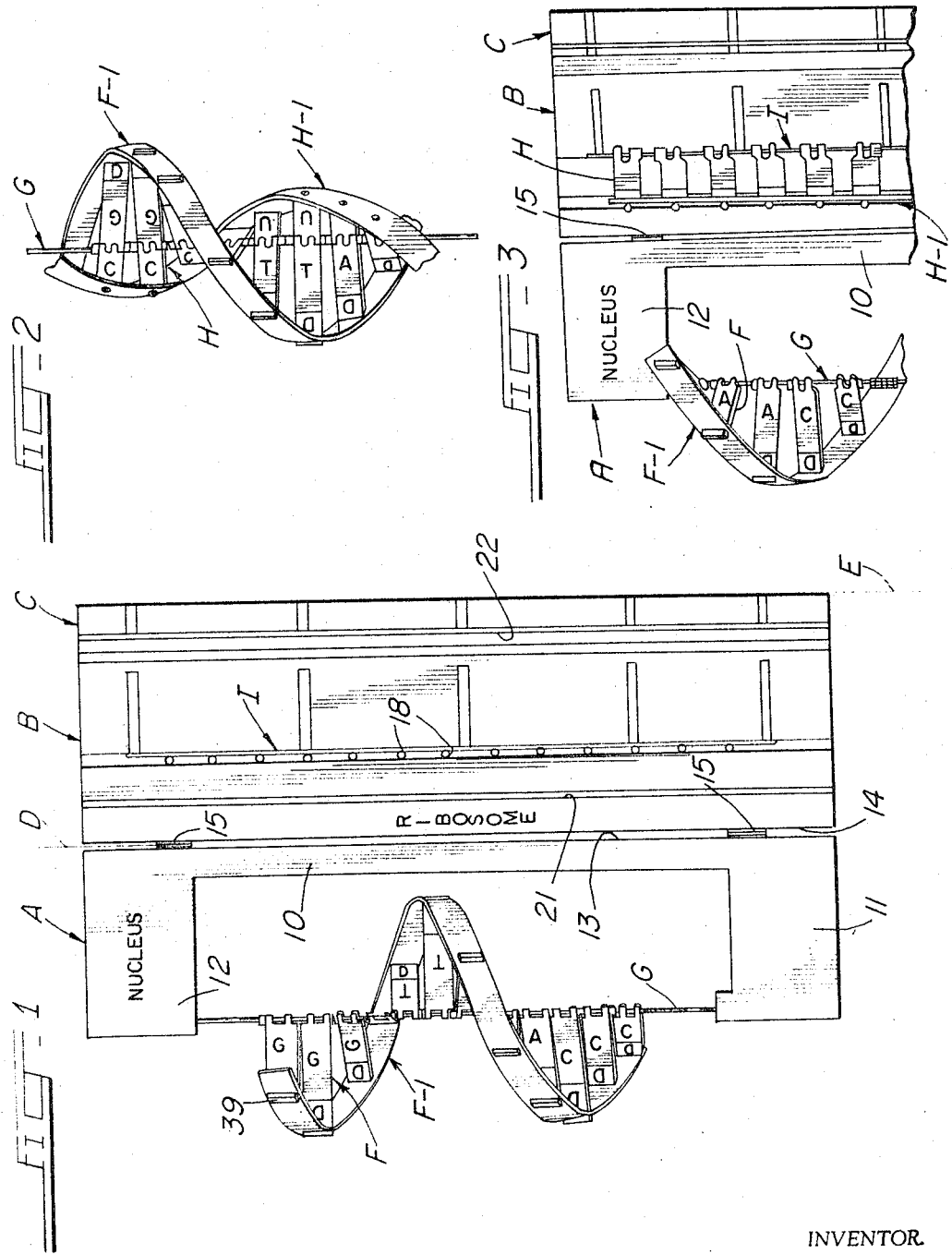
INVENTOR.
PAUL DZIULAK

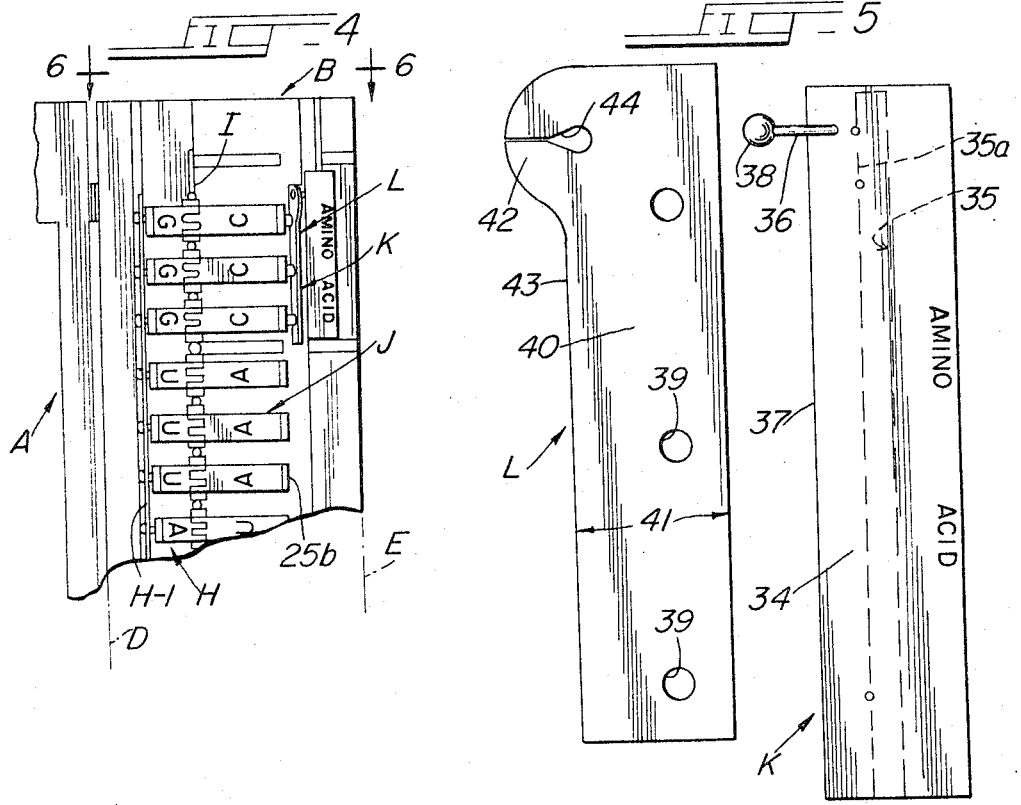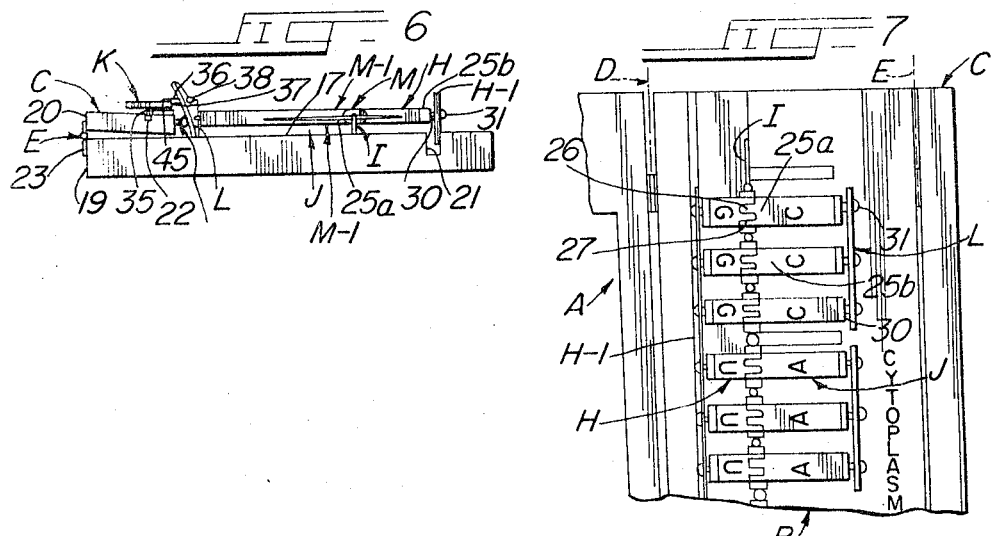

United States Patent Office 3,445,940
Patented May 27, 1969

3,445,940
RNA PROTEIN SYNTHESIS MODEL
Paul Dziulak, Powers Lake, Wis. 53159
Filed Dec. 28, 1966, Ser. No. 605,434
Int. Cl. G09b 23/26, 23/28
U.S. Cl. 35—20                                                7 Claims

ABSTRACT OF THE DISCLOSURE

The disclosure is directed to a combination of structural elements which form a visual model for teaching complex genetic phenomenon, herein particularly RNA protein synthesis with subsequent formation of cytoplasm. Hinger mounting boards are employed, one bifurcated to receive a rod therebetween for carrying a plurality of helically arranged hosts of snap-on blocks in one or more series. The second board also carries a rod for receiving one series of blocks from the first board to represent messenger RNA phenomenon. Still a third board carries magnetic means and/or mechanical grooving for retaining a third series of blocks thereon in a detachable manner. Detachable and automatically releasable means is employed to join the second and third series of blocks; pivoting motion of the second and third boards initiates automatic release of one series of blocks completely while maintaining connection with the other series in a detachable manner.

---

This invention relates to science teaching devices and more particularly to a device for coordinating simultaneous movements of several pieces at the same time for illustrating certain natural changes.

Natural phenomenon, such as the synthesis of protein from the DNA and RNA molecules and the subsequent passing of protein into cytoplasm, involves changes which are difficult to demonstrate. With such phenomenon, usually different groups of elements must be moved as a group relative to the other group and then a third group of elements must be bonded or joined to all of the elements of the second group followed by a dramatic and quick separation of the second and third groups. Not only is the visual representation difficult, but the mechanical implementation, so that it is convenient and relatively fool-proof, is difficult to achieve.

Therefore, a primary object of this invention is to provide an improved science teaching device which is effective to show separation and breakage of many bonds with respect to a plurality of related groups.

Particular structural features, which are pursuant to the above object, comprise detachable mountings between one group of elements and another group of elements which, on the one hand, comprise flexible plastic fingers adapted to press fit about a rod of dimension greater than the spacing between said fingers, and on the other hand, the use of magnetic means embedded in the elements of the various groups to provide a touch-type bond between the elements and mounting structure. For other applications, the detachable mounting may also include a rib on the elements of one group and a mating groove in the other elements or mounting structure, the grooves and ribs being adapted to provide a restraining shoulder against separation movement therebetween when the first elements are moved in a first direction. Other features may comprise the use of flexible strips acting as detachable interconnections between the elements of the various groups, the flexible strip having a slot therein and the elements having protuberances of slightly greater dimension than the slot whereby the elements having the protuberances may be dramatically disengaged from the flexible strips by withdrawal.

The above and other objects, advantages and uses of my invention will become more apparent from a reading of the following specification and claims taken in connection with the appended drawings, which form a part of the specification and wherein:

FIGURE 1 is an elevational view of a device embodying the principles of this invention and showing certain groups of elements in a first operative position;

FIGURE 2 is a fragmentary view of a portion of the structure of FIGURE 1 and illustrating an additional group of elements constituting another operative position of said device;

FIGURE 3 is still another fragmentary view of the structure of FIGURE 1 illustrating the additional group of elements in a different operative position from that in FIGURE 2;

FIGURE 4 is still another fragmentary view like that of FIGURE 3 illustrating several additional groups of elements and thereby demonstrating additional operative positions of the device;

FIGURE 5 is a greatly enlarged view of elements shown in FIGURE 4 (side elevational view);

FIGURE 6 is an enlarged plan view of the structure shown in FIGURE 4 and taken substantially along the line 6—6 thereof; and FIGURE 7 is a fragmentary view like that in FIGURE 4 but illustrating yet another operative position of the device.

Turning now to the drawings and more particularly to a preferred embodiment for illustrating RNA protein synthesis and the subsequent formation of cytoplasm, the basic components of the device comprise mounting panels or members A, B, and C; the panels A and B are hinged about an axis E parallel to axis D. A first series or group of demonstration elements (blocks) F are adapted to be mounted upon a rod or support G; unitary link means F–1 is employed to interconnect the outer ends of each of the elements of series one. A second series or group of demonstration elements (blocks) are adapted to be interchangeably mounted upon the rod G or on a second rod I; a second unitary link means H–1 is employed to interconnect the outer ends of the second series of elements. A third series or group of demonstration elements (blocks) J are detachably adapted to be carried by the support rod I in conjunction with the interchangeable second series of elements H. A fourth series of demonstration elements (blocks) K are adapted to be carried directly by the third panel C; a plurality of link means are adapted to interconnect certain of the elements K with certain of the elements J. A restraining means M is employed to normally maintain the series of elements J in a connected relationship with the rod I and another restraining means O (which may in part be of a magnetic nature) is adapted to maintain the series of elements J in a mounted position on the third panel; the restraining means M and O are related one to the other in a predetermined manner so that upon swinging of the panel C from a first position to a second position a dramatic separation of the link means L with the series of elements K may be demonstrated.

The scientific phenomenon which is to be conveyed by the preferred embodiment concerns the RNA protein synthesis; this is initiated by placing the first series of elements F in a predetermined arrangement on the support rod G. The elements are individually adapted to represent nucleic acid basis comprised of adenine, cystosine, guanine and thymine. The outer ends of the blocks F, representing sugar, are interconnected by a helical strand F–1 to represent phosphate. This helix results as one-half of a DNA molecule.

Next, the shorter blocks or elements H (representing messenger acid bases) of the second series are positioned on the rod G in a manner so that the snap-lock construction of the elements F to represent a hydrogen bond therebetween; the outer ends (representing sugar) of elements H are interconnected by the helical strand H–1, representing phosphate (the elements of series H being identitied as comprising a predetermined arrangement of guanine, cystosine, adenine and uracil). The phosphate strand H–1 is considerably shorter than the phosphate strand F–1 so that the messenger RNA molecule forms a considerably more restricted helix.

A first stage of protein synthesis comprises movement of the second series of elements H to other support rod I (which represents ribosome). The series of elements H (representing RNA messenger acid bases) are to be removed and carried in the same predetermined arrangement from rod G to rod I. With this series of elements H in place, other elements can be interconnected in a segmented manner to form a short piece of protein. As shown in FIGURE 4, the third series of elements (representing transfer RNA acid bases of cystosine, adenine, guanine, and uracil) are mounted on the rod I again with a snap-lock construction (which is referred to herein as restraining means M), the joining of the series H and J on rod I represents a hydrogen bond therebetween. Each element of series K (representing amino acid) is mounted on the backside of panel C (folded against panel B) in a transverse manner relative to the elements of series J and one of the link means L (representing peptide bond) adapted to join three elements of series J with a single element of series K (as shown in FIGURE 4).

The entire chain of four triplets of the elements J and four of the amino acid elements of series K represent a short piece of protein.

The final stage of demonstration is carried out by swinging the folded panel C to a remote position from its folded condition whereby the "energy bond" represented by the plastic protuberances interconnecting with the flexible links L are broken. This disconnection of the strip of protein represents the passage of the protein into cytoplasm and is the final stage of demonstration.

Turning now to the structure of the basic components and more particularly to the panels A, B, and C, each may be formed of wood or other relatively rigid material, the panel A being shaped with a relatively thin longitudinal body 10 and laterally extending arms 11 and 12 between which the rod G extends spaced from the body 10. The panel B is formed preferably as a rectangle and the adjacent edges 13 (of panel A) and 14 (of panel B) have suitable wood hinges 15 which are longitudinally spaced apart to define the axis D. Instead of a cut-out portion as in panel A, panel B carries rod I spaced slightly outwardly a distance 16 from one surface of panel B; spacers 18 are formed on the rod I to define areas along the rod for separating the attachment of the second and third series of elements thereon. A longitudinal groove 21 (see FIGURE 6) is defined on the face 17 extending generally parallel to the rod I and effective to provide an access space for link means H–1 to extend thereinto when the second series of elements is positioned on rod I. The third panel C is also a rectangle, but of considerably less lateral dimension than panel B; it also has a longitudinally extending groove 22, generally parallel to the axis E, which forms a part of the restraining means O as will be described. Edge 20 of panel C and edge 19 of panel B are hinged together by suitably spaced wood hinges 23 to define the axis E.

The demonstartion elements of the first, second and third series are each comprised of a plurality of blocks or elements, preferably constructed of plastic, such as acetate butyrate. Each element or block 25 in the several series is formed with an inner end 25a having a frictional snap-lock construction assembly so that it may be detachably mounted upon one of the rods I or G. The snap-lock assembly has a pair of spaced fingers 26 and 27 (along the longitudinal portion of the rod G or I) and each of the fingers are split into portions 26a and 26b (as best shown in FIGURE 6). The outer end 25b of each element has a protuberance extending outwardly therefrom which may be comprised of a neck 28 and an enlarged head portion 29. For the first series of elements, the protuberance has a generally rectangular head 29 which extends generally along the longest lateral section of the block or element. For the second and third series of elements, the protuberance comprises generally a knob or rounded head 31 carried by a considerably narrower neck portion 30.

The link means F–1 comprises a resilient flexible strip of material, such as rubber, which has spaced rectangular openings 32 therein for permitting the protuberances 28 to extend therethrough (as shown in FIGURE 1) and provide a link between the outer ends 25b of each of the first series of elements; the resulting configuration is a helix as shown in FIGURE 1. The link means H–1 is also comprised of a resilient flexible strip, such as rubber, which has generally oblong or circular openings 33 spaced therealong and adapted to receive the ball or rounded head portions 31 or the protuberances defined on the outer ends 25b of each of the second series of elements. The openings 32 and 33 in each of the link means is adapted to be slightly smaller in dimension than the protuberance so as to provide a frictional fit therebetween.

The fourth series of demonstration elements is comprised of a plurality of elements 34, each being of considerably longer length than any of the heretofore considered elements. Each element 34 is effective to span the longitudinal spacing of three of the elements of the third series as shown in FIGURE 4; each element 34 has a generally rectangular body with a rib 35 extending along the length thereof and protruding from the back. The rib 35 is adapted to form a shoulder 35a along one side for engaging a side of the groove 22 in the mounting panel C. The shoulder 35a and the side of groove 22 are designed to be transverse or perpendicular tto the direction of protuberances 36 which extend outwardly from one edge 37 of each of the elements 34. Each protuberance 36 has an outer head 38 of a generally ball-shaped configuration and adapted to squeeze-fit through oblong or circular openings formed along a mid-section of the link means L (see FIGURE 5.)

The link means L comprises a plurality of resilient flexible strips 40 having a lateral dimension 41 adapted to span the distance between the series three and four when they are in the offset condition as shown in FIGURE 6. The openings 39 are spaced longitudinally along each of the strips to receive the protuberances 31 of the series three elements. Each strip also has tongue 42 extending outwardly from one edge 43 thereof; each tongue has a slot 44 extending inwardly from the outer edge of the tongue toward a location generally aligned with the edge 43 thereof. The slot 44 is adapted to have its dimension less than the neck 36 of the protuberances of the element 34 so as to provide a frictional press-fit therebetween when engaged as shown in FIGURE 6.

The restraining means M comprises on the one hand, the combination of a rib 35 and a mating groove 22 on panel C, the combination of the rib and groove providing a restraint against detachment of the blocks or elements 34 from panel C when panel C is pivoted in a direction shown by arrow in FIGURE 6. The other portion of the restraining means O comprises magnetic means 45 embedded within the blocks or elements 34 (and may be comprised of a plurality of magnetic pieces having north and south poles). The complimentary portion of the magnetic means is a magnetically permeable strip of metal 46 carried on the outer side of the mounting panel C. Thus, when the elements 34 are positioned so that the rib 35 is received within groove 22, the magnetic means 45 is effective to provide a magnetic bond with the metallic strip 46 carried on the mounting panel C.

The restraining means O is effective to be of greater strength than the restraining means M (which comprises the split fingers 26 and 27 of the elements 25 of series three). This is important so that the last demonstration step, which is to illustrate the migration of protein into cytoplasm, the panel C may be pivoted from its position shown in FIGURE 6 to another position shown in FIGURE 7 whereby the elements 34 will be carried with the panel C causing the protuberances 36 and head 38 to withdraw from the slot 44 in the link means L, leaving the link means attached to the series three elements. This must be carried out automatically by the mere pivotal movement of panel C.

For purposes of reference in the claims, a lesser combination of the series of elements will be referred to and the designation first and second series will be only for purposes within the definition of the claims and not necessarily correspond with the designation first and second or third as used in the specification.

While the present invention has been described in connection with one specific embodiment, it is to be understood that this is by way of illustration and not by way of limitation and the scope of the invention is defined solely by the appended claims which should be construed as broadly as the prior art will permit.

What is claimed is:

1. A science teaching device, comprising: first and second mounting members hinged together for pivoting about an axis; a first series of demonstration elements detachably carried by said first mounting member; a second series of demonstration elements detachably carried by the second mounting member; means restraining the detachment of said elements from said mounting members; and flexible link means effective to interconnect said first and second series of elements in one predetermined position about said axis, and said restraining means being effective to hold said elements on their respective mounting members when said members are pivoted to another operative position about said axis with said link means automatically releasing interconnection with one series of said elements.

2. A science teaching device as in claim 1, in which said link means comprises a resilient, flexible strip having a slot at one portion thereof, said elements of said one series each having a protuberance of slightly greater dimension than said slot and effective to be press-fit within said slot to constitute said interconnection between said one series of elements and the mounting member.

3. A science teaching device as in claim 2, in which said strip also has a plurality of openings therein, and said other series of elements each having a protuberance of slightly greater dimension than said opening and effective to be press-fit therein to constitute the interconnection between said other series of elements and the mounting member.

4. A science teaching device as in claim 1, in which said restraining means holding said first series of demonstration elements on said first mounting member comprises a rib extending outwardly from each of said elements; and said first mounting member having a groove extending generally parallel to said axis, said ribs of each of the demonstration elements of said first series being received within said groove, said restraining means further comprising magnetic means disposed on each of said demonstration elements of said first series, and said first mounting member having complementary magnetic means for attracting the magnetic means of said first series of demonstration elements.

5. A science teaching device as in claim 4, in which said restraining means, effective to hold said second series of demonstration elements on said second mounting member, comprises plastic fingers spaced apart a predetermined distance for each of said elements, said second mounting member having a rod disposed generally parallel to said axis and having a cross-sectional dimension generally greater than the space between said flexible plastic fingers, whereby said fingers may be snapped about said rod for providing a friction connection therewith.

6. A science teaching device as in claim 2, in which there is a plurality of said flexible resilient strips, each strip having a tongue projecting from one edge thereof, and said slot being disposed in the outer extremity of said tongue whereby dilation of said slot by said protuberance may be facilitated.

7. A science teaching device as in claim 5, in which there is a third mounting member hinged about a second axis parallel to said first axis and spaced therefrom, said third mounting member having a second rod generally parallel to said axes and having a lateral dimension greater than the space between said resilient plastic fingers whereby the second series of demonstration elements may be manually moved from said second rod to said first rod for illustrating a chemical change.

References Cited

UNITED STATES PATENTS

| | | | |
|---|---|---|---|
| 2,961,779 | 11/1960 | Perry | 35—18.5 |
| 3,296,714 | 1/1967 | Klotz | 35—18.5 X |
| 3,320,685 | 5/1967 | Meiners | 35—19 |

OTHER REFERENCES

Science Teaching Aids Co. catalogue entitled "STA Models for Science," rec'd Sci. Library, October 1964, pp. 16–17 only.

EUGENE R. CAPOZIO, *Primary Examiner.*

HARLAND S. SKOGQUIST, *Assistant Examiner.*